Feb. 22, 1966
B. MITCHELL
3,236,333
ENERGY ABSORBER
Filed June 17, 1963
3 Sheets-Sheet 1
FIG. 1.
FIG. 2.
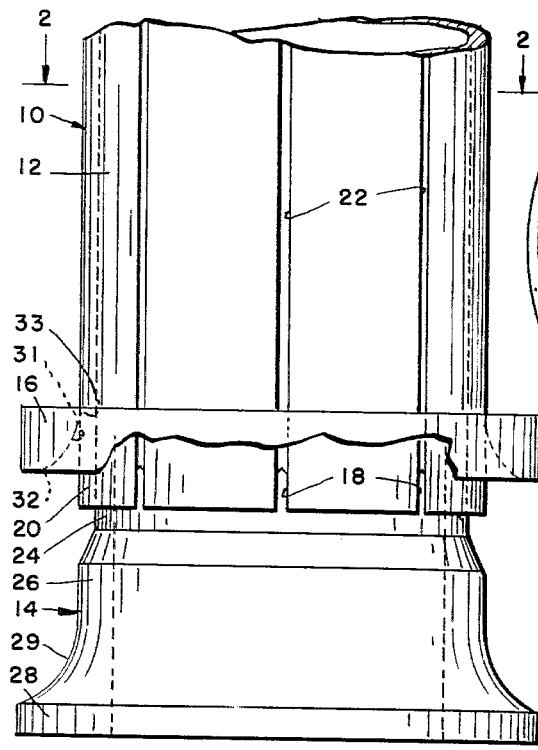
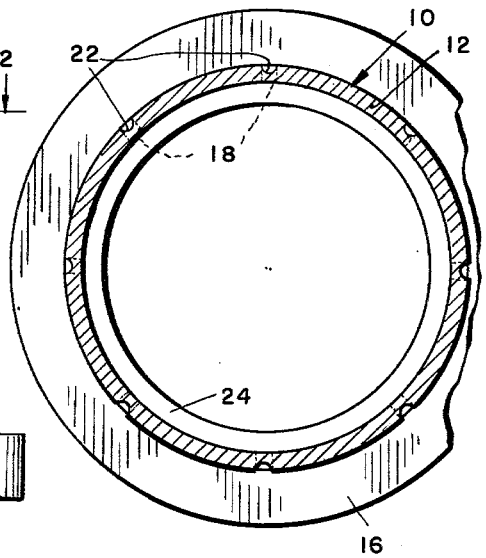
FIG. 3.
FIG. 4.
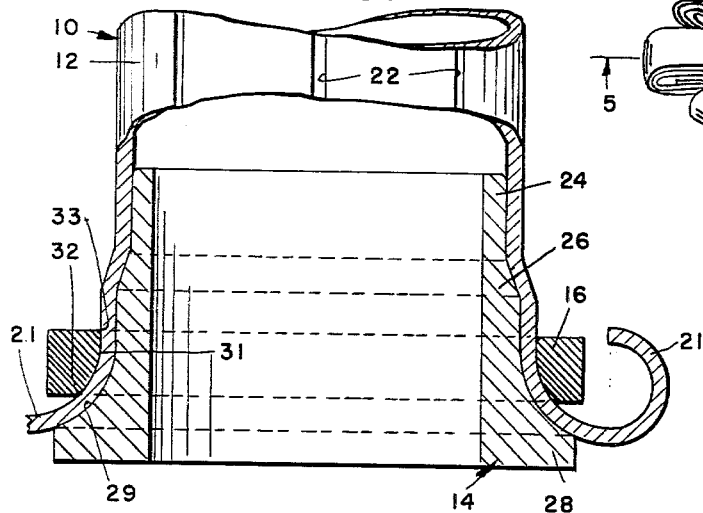
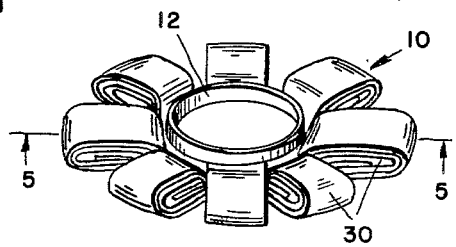
INVENTOR.
BRUCE MITCHELL
BY *George C. Sullivan*
Agent Feb. 22, 1966   B. MITCHELL   3,236,333
ENERGY ABSORBER
Filed June 17, 1963   3 Sheets-Sheet 2

INVENTOR.
BRUCE MITCHELL
BY
*George C. Sullivan*
Agent

Feb. 22, 1966  B. MITCHELL  3,236,333
ENERGY ABSORBER
Filed June 17, 1963  3 Sheets-Sheet 3

INVENTOR.
BRUCE MITCHELL
BY
Agent

United States Patent Office 3,236,333
Patented Feb. 22, 1966

3,236,333
ENERGY ABSORBER
Bruce Mitchell, Sylmar, Calif., assignor to Lockheed
Aircraft Corporation, Burbank, Calif.
Filed June 17, 1963, Ser. No. 288,109
13 Claims. (Cl. 188—1)

This invention relates to an energy absorber and more particularly to an energy absorber which accomplishes high energy absorption by controlled deformation of the material comprising the energy absorber.

Material deformation is recognized as an effective means of absorbing energy. One prior art method of absorbing energy by material deformation is the plastic deformation (material deformed beyond yield point) of stainless steel straps in tension. While generally satisfactory, this method has the disadvantage that the use of such straps is limited to tension applications.

The compressive loading of tubes has been employed as another method of absorbing energy by material deformation. This method has the disadvantage that excessive loading of a tube will cause the tube to buckle before its energy absorption function has been performed unless strict length-to-diameter ratios are observed.

Yet another prior art method of absorbing energy by material deformation comprises splitting a square tube along its length by employing a splitting device having sharpened corners which cut the tube along its inner edges. This method has the disadvantage that it may not be employed for high energy absorption unless excessively heavy materials are employed. It also has the disadvantage that the rate of splitting cannot be satisfactorily controlled.

In view of the foregoing factors and conditions characteristic of devices which accomplish absorption of energy by material deformation, it is a primary object of the present invention to provide a new and improved energy absorber not subject to the disadvantages enumerated above and providing controlled deformation of a tube by means of a splitter ring and a friction control ring efficiently, safely and expeditiously.

Another object of the present invention is to provide an energy absorption device having a low onset load which remains substantially constant over the length of the energy absorbing stroke.

Yet another object of the present invention is to provide an energy absorption device having a high efficiency as measured by the ratio of the energy absorbed to the total weight of the absorbing material.

Another object of the present invention is to provide an energy absorption device which is capable of absorbing energy over a relatively long distance.

A further object of the present invention is to provide an energy absorption device which employs a cylindrical tube and means for controlling the absorption of a load at a level near the original strength of the tube while using up the entire tube.

A still further object of the present invention is to provide an energy absorption device having a splitter base which divides a tubular member into a predetermined number of strips and rolls the strips into coils while an external ring controls the load and prevents the splits from advancing above the base.

Yet another object of the present invention is to provide a tubular energy absorption device having means for maintaining the original strength of the tube while it is being coiled up into ribbons by passing between a control ring and a splitter base.

Another object of the present invention is to provide a shock absorber for vehicles having a low energy absorption component and a high energy absorption component.

According to the present invention, a cylindrical, tubular member is employed as a high energy absorption member and absorbs energy by being split into ribbons longitudinally in a predetermined manner. One end of the tube is provided with a plurality of notches evenly spaced about the periphery of the end of the tube and a splitter wedge is placed in the notched end of the tube. When the tube is subjected to an axial load, the splitter wedge induces splitting of the tube which starts at the root of each notch and progressively consumes the tube by coiling it into ribbons corresponding in number with the notches. Energy absorption efficiency is high because of the double curvature of the ribbon split from a round tube.

An external control ring may encompass the tube adjacent the splitter wedge to restrain the passage of the tube down over the splitter wedge. This forces the load up to the full strength capability of the original tube and maintains the load through the full travel length of the tube.

The present invention also combines a low energy shock absorber with a high energy shock absorber, wherein the low energy shock absorber absorbs conventional shocks imposed upon a vehicle, such as an aircraft upon landing, and the high energy shock absorber is provided as a safety measure should the low energy shock absorber experience a shock exceeding its capacity.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is an elevational view of a first embodiment of a high energy absorption device of the present invention with parts broken away to show internal construction;

FIGURE 2 is a transverse, cross-sectional view taken along line 2—2 of FIGURE 1;

FIGURE 3 is an elevational view, partially in cross-section, of the device of FIGURE 1 with the parts shown in a different position;

FIGURE 4 is a perspective view of a device of the invention showing its condition after it has absorbed a shock load;

Figure 5:
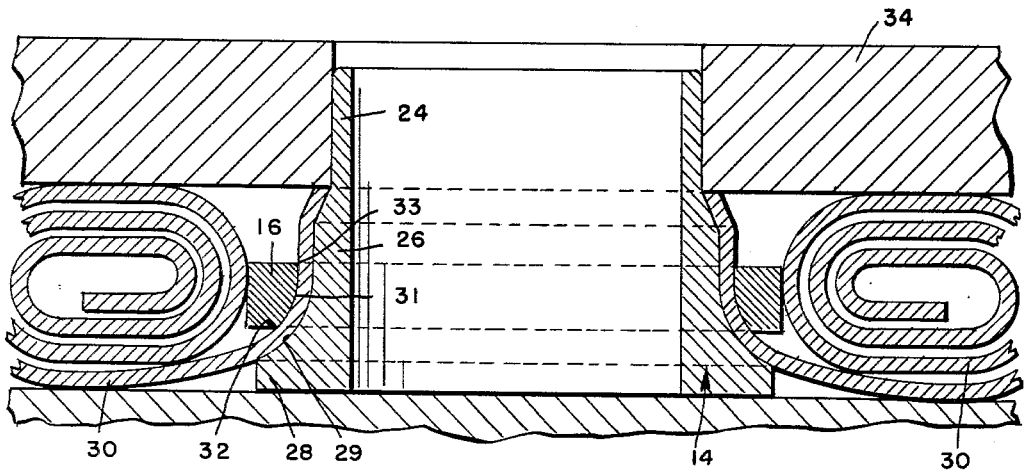
FIGURE 5 is a vertical cross-sectional view taken along line 5—5 of FIGURE 4.

Referring again to the drawings and particularly to FIGURES 1–5, a high energy absorption device constituting a first embodiment of the present invention, generally designated 10, includes a cylindrical tubular member or tube 12, an annular splitter wedge 14 and an annular control ring 16.

The cylindrical tubular member 12 may be selected for its energy absorption characteristics in relation to the amount of energy to be absorbed in a particular application. For example, it has been found that a 2 in. diameter, 304 stainless steel tube having 0.048 in. wall and a ⅛ hard condition will absorb approximately 250,000 in.-lb. per pound. A plurality of slits or notches 18 is cut into the end 20 of tubular member 12 to assure that it will split into uniform ribbons 21 as it passes down over the splitter wedge 14. In some cases, such as when the tubular member 12 is made of titanium, it may be desirable to score the member 12 with longitudinal grooves 22 extending from each slit 18 at end 20 to the other end of the tubular member. This is to assure that the ribbons 21 will be of uniform width throughout the length of the tubular member 12 and will not spiral about the tubular member. With most materials, however, this scoring is not necessary.

The wedge 14 includes a cylindrical guide 24 of slightly smaller diameter than the inside diameter of tubular member 12 so that guide 24 will slip easily into the end 20, but still provide support against inward buckling at the end 20. The wedge 14 also sometimes includes an enlarged mid-portion 26 as well as a base portion 28. A concave wall or splitter face 29 connects base 28 to mid-portion 26 and forms ribbons 21 into coils 30 (FIGURE 4) as the splitter wedge 14 splits tubular member 12.

The straight guide portion 24 may extend down to concave face 29 of the wedge 14 for low energy applications. The concave section 29 serves to swell both the tube 12 and the control ring 16 (to a limited extent) for the twofold purpose of overcoming size variations in the tube 12 and to put a known tension load in the control ring 16 by stretching it past its yield stress. The straight portion 26 also maintains an even bursting stress on tube 12 and control ring 16.

The tubular member 12 will split into ribbons 21 under a minimum load without the use of the control ring 16. However, the stress level of tubular member 12 can be raised to the buckling or column strength of tube 12 by employing the control ring 16. The amount of control is achieved by the thickness, depth and strength of ring 16. These dimensions are fixed and the fit of the control will remain constant over the full length of the tube as it is split because the swelled portion of the splitter forces a uniform fit and maintains a constant load level as the entire tube is consumed. The coefficient of friction should also remain constant. This may be accomplished by employing lubricants or by using dissimilar metals. Also, the tube-contacting face 31 of ring 16 slopes outward to a rounded edge 32 to minimize the overturning moment created by the ribbons 21 which tend to cause the upper edge 33 of ring 16 to dig into the tube 12. The control ring 16 is positioned within the radius of curvature of the splitter wedge as shown in FIGURES 1–5, or, as shown in the other drawings, at a distance sufficiently far removed from the wedge surface to permit passage of the tube, but close enough to apply control pressure at the split initiating position of the tube and to prevent buckling or premature splitting of the tube.

The end 20 of tube 12 in FIGURE 1 must precede control ring 16 by a small amount to insure passage of the ribbons 21 between control ring 16 and splitter base 28. The device is ready for operation when the tube 12, the control ring 16, and the splitter 14, are in the position shown in FIGURE 3 with the ribbons 21 just starting past the base 28.

In FIGURES 4 and 5, the tube 12 is shown in a completely deformed condition wherein 8 ribbons 21 have been tightly coiled into coils 30 as a load 34 pushed tube 12 through splitter wedge 14. When the ribbons are so coiled they are sometimes referred to as being plastically deformed, i.e., they have been deformed beyond their yield point so as to take a permanent set in the coiled configuration. As the coils 30 increase in diameter, they bear tightly against the control ring 16 thereby causing a slight increase in friction between the ring and the tube. The tube 12 can be designed to withstand the upper limit of load without failure if the control ring 16 and the splitter wedge 14 permit the tube 12 to pass through at this load level. The upper load limit cannot be exceeded until the full travel of the tube is used up. If some energy still remains this residual shock may be absorbed through the flattening of coils 30 by load 34 (FIGURE 5).

While many uses for the high energy absorption device 10 will manifest themselves, one suggested use is to employ it as a shock absorber for an automobile bumper. In this application, the base 28 of wedge 14 could be slipped over the end of an automobile frame, not shown, so that the tube 12 would extend from the end of the automobile. The bumper of the automobile would then be connected to the end of tube 12 which is remote from wedge 14.

Figure 6:
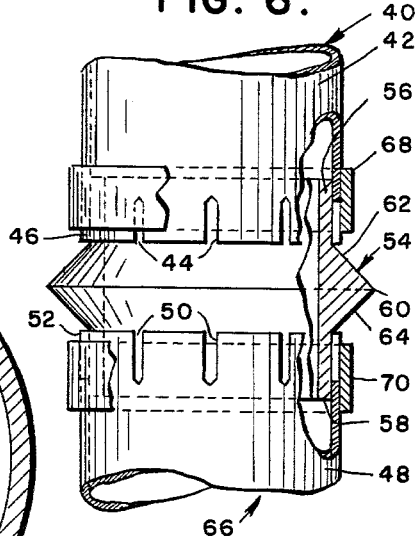
FIGURE 6 is an elevational view, with parts shown in cross-section, of a second embodiment of an energy absorption device of the present invention.
Figure 7:
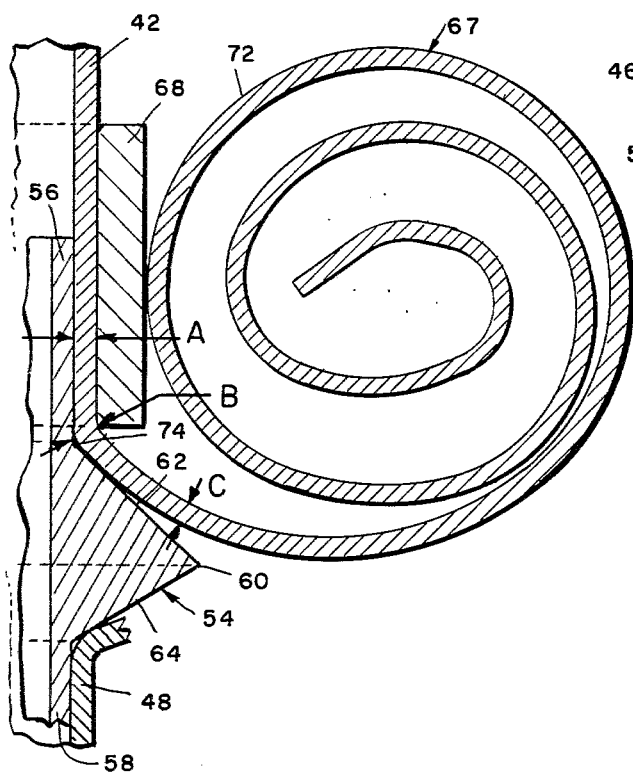
FIGURE 7 is a cross-sectional view of a portion of the device of FIGURE 6 showing the condition of certain parts thereof after the device has absorbed a shock load.

Referring now to FIGURES 6 and 7, a second embodiment of the present invention is shown wherein a high energy absorption device 40 includes an upper cylindrical tube 42 having notches 44 at one end 46 and a lower cylindrical tube 48 having notches 50 at one end 52. A splitter wedge 54 has an upper guide portion 56, a lower guide portion 58 and an enlarged mid-portion 60. A first sloping face 62 connects the upper guide 56 to the midportion 60 and a second sloping face 64 connects the lower guide 58 to mid-portion 60. The upper guide 56 engages the notched end 46 of tube 42 and the lower guide 58 engages the notched end 52 of tube 48 to join the tubes together to form one continuous tube or leg 66 which could be employed, for example, as one of the legs of a parachute-lowered package, not shown. The splitter wedge 54 is placed intermediate the ends of the leg 66 so that when either one or both tubes 42 and 48 are split, coil ribbons, such as the coil 67 shown for tube 42 in FIGURE 7, will not interfere with the connections made between the leg 66 and the package or between the leg 66 and the ground-contacting portion of the package, not shown.

A first control ring 68 may be shrunk fit, or swelled by making the splitter of the configuration shown in FIGURE 3, onto the end 46 of tube 42 adjacent the wedge 54 and a second control ring 70 may be similarly applied on the end 52 of tube 48 adjacent the wedge 54. When the tubes 42 and 48 are subjected to an axial, shock load, either one or both of the tubes will start feeding over a respective sloping face of the wedge 54 to induce sufficient hoop tension stress into the notched end of the respective tube to cause it to start splitting longitudinally at the root of its notches. The slope of the respective face 62 or 64 will cause the split ribbons, such as the ribbon 73 shown in FIGURE 7 for the upper tube 42, to coil against control ring 68 pressing it tighter against tube 42. The steeper the slope on faces 60 and 62, the tighter the control rings must fit. For example, a slope of 45° or concave radius of .25 inch has been found to be satisfactory and it keeps the bursting stress in each control ring within its strength limits.

By having the inside diameters of the control rings 68 and 70 smaller than the outside diameter of their respective tubes, a compressive stress is put in the tube and a tensile stress is put in the ring when the two are mated. The internal wedge force of the splitter wedge 54 then forces either one or both tubes and their respective rings to expand until the ring diameters are enough larger than the original tube diameters that the tubes will reach their splitting stresses. As the tubes split, ribbons will form coils, as shown for one ribbon 72 and coil 67 in FIGURE 7. The coefficient of friction of a control ring on its tube is sufficient to hold the ring down against the ribbon. Since there is a substantial load built up when the cracks first start at the root of the notches, it is sometimes desirable to push the control ring a little beyond the notches so the cracks will not start before the restraint of the ring is felt.

As shown in FIGURE 7, the compression yielding of the material of tube 42 causes it to thicken. In a tube having an original thickness of 0.048 in., the thickness between the control ring 68 and the guide portion 56 of the splitter wedge 54 has been measured at dimension A and found to be 0.0458 in.±0.0005 in. At the corner 74 where the ribbon 72 has its beginning, the thickness was measured at B as 0.0535 in.±0.002 in. and the final ribbon thickness was 0.0533 in.±0.0005 in. as measured at dimension C. This represents a plastic deformation of 11%.

The tubes shown in FIGURES 8, 9, 10, and 11, are designed to be used where good efficiency under light loads and long travel distances are a requirement.

Figure 8:
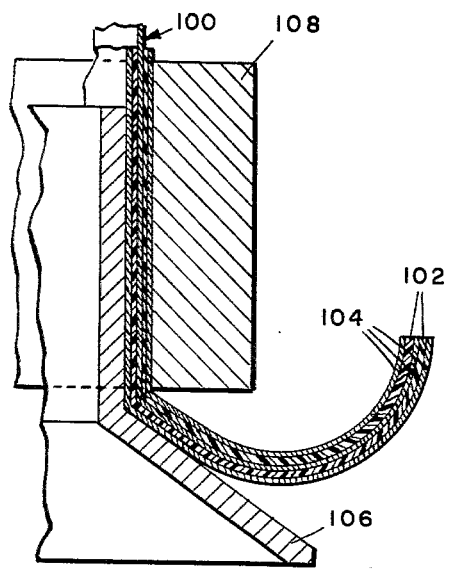
FIGURE 8 is a partial, cross-sectional view, showing a laminated tube which may be employed as an absorption device of the present invention.

In FIGURE 8, a low-density, laminated tube 100 is made by using a plurality of relatively thick layers of a low-density bonding resin 102 between layers of foil gage metal 104. A splitter wedge 106 and a control ring 108 may be employed as previously described in connection with the first two embodiments of the present invention.

Figure 9:
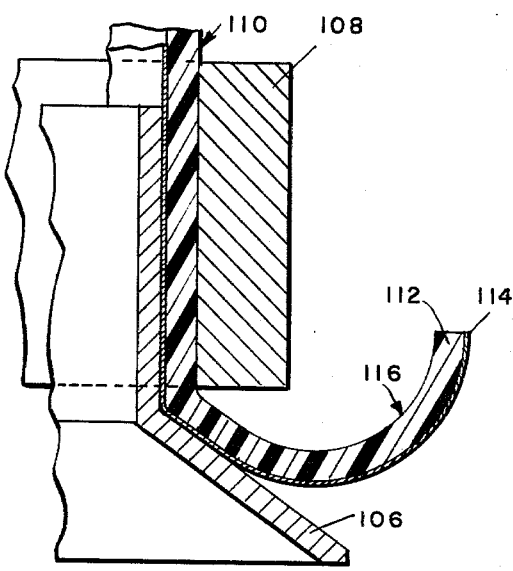
FIGURE 9 is a partial, cross-sectional view of a plastic tube which may be employed as an absorption device of the present invention.

The tube 110 of FIGURE 9 may comprise an external layer of a low-density plastic material 112 bonded to the outside of a foil-gage tubular member 114. The splitter wedge 106 and the control ring 108 of FIGURE 8 may be used to split tube 110 into coils, such as the one shown at 116.

Figure 10:
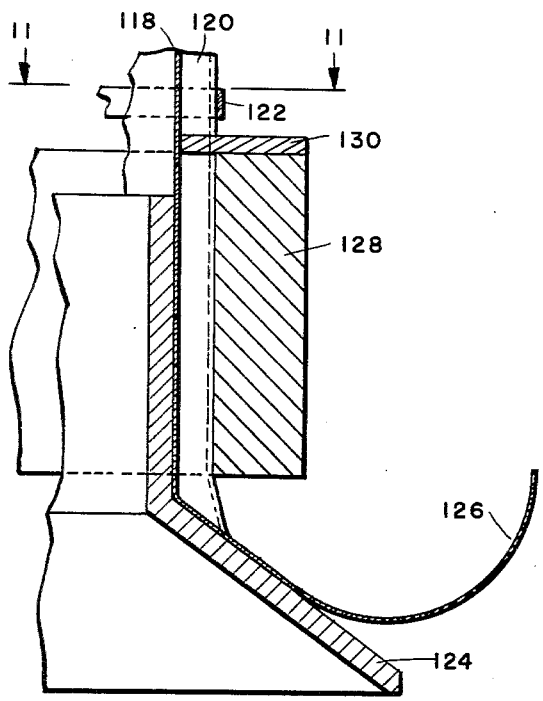
FIGURE 10 is a partial, cross-sectional view of a corrugated tube which may be employed as an absorption device of the present invention.
Figure 11:
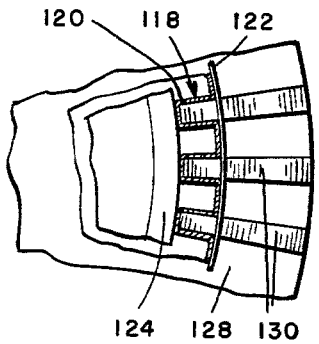
FIGURE 11 is a partial plan view taken along line 11—11 of FIGURE 10.

In FIGURES 10 and 11, a tube 118 of foil gage is made with miniature corrugations 120 running lengthwise. The corrugated tube 118 is given local columnar stability by placing narrow external bands of foil 122 about its periphery. The initial slits, not shown, may be cut in the top of every corrugation. A longer slope and larger diameter is needed for the base of a splitter wedge 124 than in the previous embodiments to completely flatten the corrugations 120 for splitting them into ribbons, one of which is shown at 126. A control ring 128, having a wedge insert or rib 130 for each open corrugation, may be used to control the splitting of tube 118.

While the particular high energy shock absorbers herein shown and described in detail are fully capable of attaining the objects and providing the advantages hereinbefore stated, it is to be understood that they are merely illustrative of the presently preferred embodiments of the present invention and that no limitations are intended to the details of construction or design herein shown other than as defined in the appended claims.

What is claimed is:
1. An energy absorber comprising:
  (a) a round tubular member adapted to absorb energy upon the plastic deformation thereof;
  (b) tube deforming means axially aligned with said tubular member for creating sufficient hoop tension stress in one end of said tubular member to split said tubular member when it is subjected to an axial shock load of predetermined magnitude, said tube deforming means causing a plastic deformation of said tubular member by converting said axial shock load into a compression yielding of the material of which said tubular member is made; and
  (c) non-destructible control means upon said tubular member for controlling tube deformation throughout energy absorption phases.
2. An energy absorber comprising:
  (a) a tubular member adapted to absorb energy upon the plastic deformation thereof;
  (b) tube splitting means mounted in one end of said tubular member for creating sufficient hoop tension stress in said one end to split said tubular member when it is subjected to an axial shock load; and
  (c) annular control means mounted circumferentially about said tubular member adjacent said tube deforming means for movement over said tubular member for restraining the expansion of said tubular member when said hoop tension stress is created.
3. An energy absorber comprising:
  (a) a tubular member adapted to absorb energy upon the plastic deformation thereof, said member having notches cut in one end thereof;
  (b) tube splitting means mounted in said notched end of said tubular member for creating sufficient hoop tension stress in said notched end to split said tubular member into ribbons corresponding in number to said notches when said tubular member is subjected to an axial shock load; and
  (c) a control ring encompassing said tubular member adjacent said tube deforming means for restraining the expansion of said tubular member by said tube deforming means.
4. An energy absorber comprising:
  (a) a cylindrical tube adapted to absorb energy upon the deformation thereof, one end of said tube having a plurality of notches cut therein;
  (b) a cylindrical guide member slidably mounted in said one end of said tube to prevent inward buckling thereof when said tube is subjected to an axial shock load;
  (c) a cylindrical tube-splitting wedge connected to said guide member adjacent said one end of said tube, said wedge including a sloping face adapted to create hoop tension stress in said one end and split said one end into ribbons when said tube is subjected to an axial shock load, said ribbons corresponding in number to said notches and continuing to form axially along said tube while said shock load persists; and
  (d) a control ring encompassing said tube adjacent said wedge for restraining expansion of said one end of said tube when said hoop tension stress is created, whereby said axial shock load causes a compression yielding of said tube resulting in the plastic deformation thereof.
5. The energy absorber of claim 4 wherein said wedge includes a base and said sloping face forms an angle of between 30 degrees and 60 degrees.
6. The energy absorber of claim 4 wherein said wedge includes a base and said sloping face forms an angle of 45 degrees therewith.
7. The energy absorber of claim 4 wherein said wedge includes means to expand said control ring a predetermined amount to permit passage of said tube between said ring and said wedge to prevent the axial loading of said tube from exceeding the strength thereof while maintaining said axial loading at the approximate strength of said tube.
8. The energy absorber of claim 4 wherein said sloping face of said wedge is concave and said control ring has a convex, inner face for minimizing the overturning moment imparted to said ring by said ribbons.
9. The energy absorber of claim 4 wherein said tube includes a groove extending from each of said notches to the other end of said tube.
10. The energy absorber of claim 4 wherein said tube comprises a plurality of layers of foil gage metal bonded to a resinous material.
11. The energy absorber of claim 4 wherein said tube comprises an inner tube of foil gage metal and an outer tube of a low-density plastic material.
12. The energy absorber of claim 4 wherein said tube is corrugated and said control ring includes a rib extending into each open corrugation.
13. An energy absorber comprising:
  (a) a first tubular member having a plurality of notches formed in one end thereof;
  (b) a second tubular member having a plurality of notches formed in one end thereof;
  (c) tube splitting means having a first guide portion slidably engaging the notched end of said first tubular member and a second guide portion slidably engaging the notched end of said second tubular member, said splitting means including a first sloping face connecting said first guide portion to an enlarged mid-portion of said tube splitting means and a second sloping face connecting said second guide portion to said enlarged mid-portion, said tube splitting means being adapted to create sufficient hoop tension stress in said notched ends of said tubular members to split said tubular members when they are subjected to an axial shock load of predetermined magnitude, said tube splitting means causing plastic deformation of said tubular members by converting said axial shock load into a compression yielding of the material of which said tubular members are made; and (d) a first control ring encompassing said first tubular member adjacent said first sloping face and a second control ring encompassing said second tubular member adjacent said second sloping face, said control rings being adapted to restrain the expansion of their respective tubular members by said enlarged mid-portion.

References Cited by the Examiner

UNITED STATES PATENTS 3,143,321   8/1964   McGeehee et al. _____ 188—1 X

FOREIGN PATENTS 472,071   3/1951   Canada.
884,953   12/1961   Great Britain.

FERGUS S. MIDDLETON, *Primary Examiner.*

DUANE A. REGER, ARTHUR L. LA POINT,
*Examiners.*